(12) United States Patent
Sass et al.

(10) Patent No.: US 6,769,028 B1
(45) Date of Patent: Jul. 27, 2004

(54) METHOD AND APPARATUS FOR SHARING STREAMING MEDIA LINKS

(75) Inventors: Jonathan M Sass, Truckee, CA (US); Mark T. Bolas, Mountain View, CA (US)

(73) Assignee: Sonicbox, Inc., Mountain View, CA (US)

(*) Notice: Subject to any disclaimer, the term of this patent is extended or adjusted under 35 U.S.C. 154(b) by 0 days.

(21) Appl. No.: 09/579,580

(22) Filed: May 26, 2000

(51) Int. Cl.$^7$ .............................................. G06F 15/16
(52) U.S. Cl. ..................... 709/231; 709/236; 709/203
(58) Field of Search ................................. 709/231, 203, 709/236; 707/104.1; 715/500.1

(56) References Cited

U.S. PATENT DOCUMENTS

| | | | |
|---|---|---|---|
| 5,142,528 A | 8/1992 | Kobayashi et al. | ........... 370/79 |
| 5,557,541 A | 9/1996 | Schulhof et al. | ............ 364/514 |
| 5,572,442 A | 11/1996 | Schulhof et al. | ............ 364/514 |
| 5,629,867 A | 5/1997 | Goldman | .................... 364/514 |
| 5,636,140 A * | 6/1997 | Lee et al. | .................... 370/469 |
| 5,726,909 A | 3/1998 | Krikorian | ................... 364/514 |
| 5,778,187 A | 7/1998 | Monteiro et al. | |
| 5,790,423 A | 8/1998 | Lau et al. | ..................... 364/514 |
| 5,809,246 A | 9/1998 | Goldman | ............... 395/200.47 |
| 5,828,839 A | 10/1998 | Moncreiff | .............. 395/200.34 |
| 5,841,979 A | 11/1998 | Schulhof et al. | ....... 395/200.67 |
| 5,859,660 A | 1/1999 | Perkins et al. | |
| 5,892,536 A | 4/1999 | Logan et al. | .................. 348/13 |
| 5,917,830 A | 6/1999 | Chen et al. | |
| 5,922,045 A | 7/1999 | Hanson | ....................... 709/206 |
| 5,926,624 A | 7/1999 | Katz et al. | ............. 395/200.47 |
| 5,928,330 A * | 7/1999 | Goetz et al. | ................. 709/231 |
| 5,933,811 A | 8/1999 | Angles et al. | |
| 5,956,681 A | 9/1999 | Yamakita | .................... 704/260 |
| 6,012,086 A | 1/2000 | Lowell | ....................... 709/218 |
| 6,014,569 A | 1/2000 | Bottum | ....................... 455/466 |
| 6,088,455 A | 7/2000 | Logan et al. | |
| 6,248,946 B1 | 6/2001 | Dwek | |
| 6,249,810 B1 | 6/2001 | Kiraly | |
| 6,289,207 B1 | 9/2001 | Hudecek et al. | |
| 6,314,094 B1 | 11/2001 | Boys | |

(List continued on next page.)

OTHER PUBLICATIONS

Don't Touch that URL, *http//:csmweb2.emcweb.com/durable/2000/05/04/p11s1.htm*, 5 pages.

(List continued on next page.)

*Primary Examiner*—Frantz B. Jean
(74) *Attorney, Agent, or Firm*—Townsend and Townsend and Crew, LLP

(57) ABSTRACT

A method for a computer system having a display, an audio output device, and a user input device includes displaying a graphical user interface on the display, the graphical user interface including a tuning portion and a first user-selectable icon, receiving a first user selection on the display, the first user selection of the tuning portion, determnining a selection of a pre-defined identifier in response to the first user selection, identifying a streaming media source in response to the pre-defined identifier outputting streaming media data from the streaming media source to the audio output device, receiving a second user selection on the display, the second user selection of the first user-selectable icon, determining a selection of a new identifier in response to the second user selection, associating the new identifier with the streaming media source, thereafter receiving a third user selection on the display, the third user selection of the tuning portion, determining another selection of the new identifier in response to the third user selection, identifying the streaming media source in response to the another selection of the new identifier, and thereafter outputting additional streaming media data from the streaming media source to the audio output device.

20 Claims, 11 Drawing Sheets

U.S. PATENT DOCUMENTS

| | | |
|---|---|---|
| 6,317,761 B1 | 11/2001 | Landsman et al. |
| 6,339,761 B1 | 1/2002 | Cottingham |
| 6,349,329 B1 | 2/2002 | Mackintosh et al. |
| 6,351,736 B1 | 2/2002 | Weisberg et al. |
| 6,381,314 B1 | 4/2002 | Walinski |
| 6,389,463 B2 | 5/2002 | Bolas et al. |
| 6,389,467 B1 | 5/2002 | Eyal |
| 6,418,138 B1 | 7/2002 | Cerf et al. |
| 6,434,621 B1 | 8/2002 | Pezzillo et al. |
| 6,463,468 B1 | 10/2002 | Buch et al. |
| 6,487,663 B1 | 11/2002 | Jaisimha et al. |
| 6,496,857 B1 | 12/2002 | Dustin et al. |
| 6,546,421 B1 | 4/2003 | Wynblatt et al. |
| 6,557,028 B2 | 4/2003 | Cragun |
| 6,560,651 B2 | 5/2003 | Katz et al. |
| 6,615,039 B1 | 9/2003 | Eldering |
| 2001/0034219 A1 | 10/2001 | Hewitt et al. |
| 2002/0072326 A1 | 6/2002 | Qureshey et al. |

OTHER PUBLICATIONS

Jim Davis, Kerbango launches Web site, plans Net radio appliance, http://news.comcom/2100–1040–231320.html, Oct. 13, 1999, 2 pages.

Winamp v2.60 Nullsoft, Inc., http://www.winamp.com, Feb. 11, 2000, 7 pages.

Shoutcast.com, Oct. 24, 2002, 3 pages.

RealPlayer Plus™ G2 Manual, http://service.real.com/help/player/plus_manual.g2/htmfiles/notice.htm, Oct. 23, 2002, 18 pages.

Yahoo launces digital music endeavor, news.com, Oct. 23, 2002, 3 pages.

Frankel, Justin; Greely, Dave; Sawyer, Ben; MP3 Power? With Winamp: May 15, 1999; Muska & Lipman Publishing; Paperback.

Nullsoft Winamp Screenshots; version 2.11 (x86); Apr. 13, 1999, Figures 1–7.

* cited by examiner

METHOD AND APPARATUS FOR SHARING STREAMING MEDIA LINKS

CROSS-REFERENCES TO RELATED APPLICATIONS

The present invention disclosure incorporates U.S. patent application Ser. No. 09/334,846, filed Jun. 16, 1999, entitled "Internet Radio Receiver and Interface", and U.S. patent application Ser. No. 08/984,772, filed Dec. 4, 1997, entitled "Apparatus for Distributing and Playing Audio Information" by reference for all purposes.

BACKGROUND OF THE INVENTION

This present invention generally relates to apparatus and techniques for streaming media distribution via computer networks. More particularly, the present invention provides a system and a method for maintaining and sharing lists of selected media sources. Merely by way of example, the present invention is implemented on a personal computer, but it would be recognized that the invention has a much broader range of applicability. The invention can be applied to other computing devices, such as cellular phones, internet appliances, personal digital assistants, laptop computers, set top boxes, television, wireless devices, and the like.

A long time ago, music could only be heard at a live performance. Here, a performer would stand in front of an audience and sing a piece in a manner to please the audience. "Star Spangled Banner" would echo out to the audience. The live performer could only sing so loud to carry his/her audio signals out to the audience. Only a limited number of people could actually enjoy and listen to the performer at the live performance. One would find the performer in a park or theater singing a musical piece to a limited number of people. Musicians who played instruments could also be heard only at a live performance. Sounds from piano, trumpets, and drums would ring out! The beat of drums! Piano keys! Ring from trumpets sound out!-only as far as the sounds travel through air. Accordingly, only live performances could be used for people to enjoy music.

As time progressed, radio replaced, in part, some aspects of the live performances. Radio uses a wireless transmission and reception of electric impulses or signals by means of electric waves, which travel through air. By way of radio, audio information from sounds or songs would be transmitted from a broadcasting station to numerous radio receiving units, commonly called radios. These radios would tune into one of a plurality of broadcasting stations, which transmitted audio information from the station to each of the radios within a specific geographic region. High school students tuned into stations on a frequency modulated format called "FM" to listed to jazz, rock, country, and pop music. Amplitude modulated formats, commonly called "AM," often transmitted signals more efficiently over longer distances than FM. Since the electronic waves traveled through air, transmission distance was still limited, often to geographical regions.

In the 1990's, computers were coupled to each other through a world wide area network, commonly the Internet. The Internet revolutionized communication throughout the world. These computers began carrying audio information from a source location to a destination or client. Some source locations began transmitting audio information in the form of songs or sounds to destination locations. Unfortunately, most of these source locations failed to provide an easy to use interface device, which allowed users to freely use such audio information. In most cases, such sources provided Internet radio by merely providing source addresses, such as http://www.bbc.co.uk/worldservice/ram/live$_{13}$ infent.ram, which would make it difficult to easily reach many channels in an efficient manner.

From the above, it is seen that an improved way to transmit radio station information is highly desirable.

SUMMARY OF THE INVENTION

According to the present invention, a technique including a method and system for storing lists of streaming media sources is provided. More particularly, the invention provides a server-side method for allowing different users to access different lists of streaming media sources using the same client software. Merely by way of example, the present invention is implemented on a personal computer, but it would be recognized that the invention has a much broader range of applicability. The invention can be applied to other computing devices, such as cellular phones, internet appliances, personal digital assistants, laptop computers, set top boxes, game consoles such as Sony Playstation2, Sega Dreamcast, Microsoft X Box, Nintendo, and the like, television, wireless devices, and the like.

According to an aspect of the invention, a method for a computer system having a display, an audio output device, and a user input device is disclosed. The method includes displaying a graphical user interface on the display, the graphical user interface including a tuning portion and a first user-selectable icon, receiving a first user selection on the display, the first user selection of the tuning portion, and determining a selection of a pre-defined identifier in response to the first user selection. The technique may also include identifying a streaming media source in response to the pre-defined identifier, outputting streaming media data from the streaming media source to the audio output device, and receiving a second user selection on the display, the second user selection of the first user-selectable icon.

Determining a selection of a new identifier in response to the second user selection and associating the new identifier with the streaming media source are also performed. Thereafter, the method may include receiving a third user selection on the display, the third user selection of the tuning portion, determining another selection of the new identifier in response to the third user selection, and identifying the streaming media source in response to the another selection of the new identifier. Thereafter the step of outputting additional streaming media data from the streaming media source to the audio output device may be performed.

According another aspect of the invention, a computer server having a processor includes a tangible media coupled to the processor. The tangible media includes an association among a new identifier, a pre-defined identifier, and a profile identifier from a first client computer. The tangible media also includes code that directs the processor to receive the profile identifier from a second client computer, code that directs the processor to receive the new identifier from the second client computer, the new identifier determined in response to a first user selection of a graphical user interface on a display of the second client computer, the graphical user interface including a tuning portion, the first user selection of the tuning portion, code that directs the processor to retrieve the pre-defined identifier in response to the profile identifier and the new identifier, and code that directs the processor to determine the uniform resource locator for the streaming media source in response to the pre-defined identifier; and code that directs the processor to send the uniform resource locator to the second client computer.

According to yet another aspect of the invention, a method for a computer system includes sending a request to a computer server, the request comprising an identifier associated with a first user and tuning data, the tuning data comprising a band selection and a channel selection, the tuning data determined in response to input from a second user of a tuner portion of a remote tuner coupled to the computer system, and receiving a network address of a streaming media source from the computer server in response to the request, the network address determined in response to the identifier associated with the first user and the tuning data determined in response to the input from the second user. The technique may also include requesting streaming media data from a content server at the network address, decoding the streaming media data received from the content server to form a stream of audio data, and outputting the audio data to speakers coupled to the computer system.

Various additional objects, features and advantages of the present invention can be more fully appreciated with reference to the detailed description and accompanying drawings that follow.

DESCRIPTION OF THE SPECIFIC EMBODIMENTS

Figure 1:
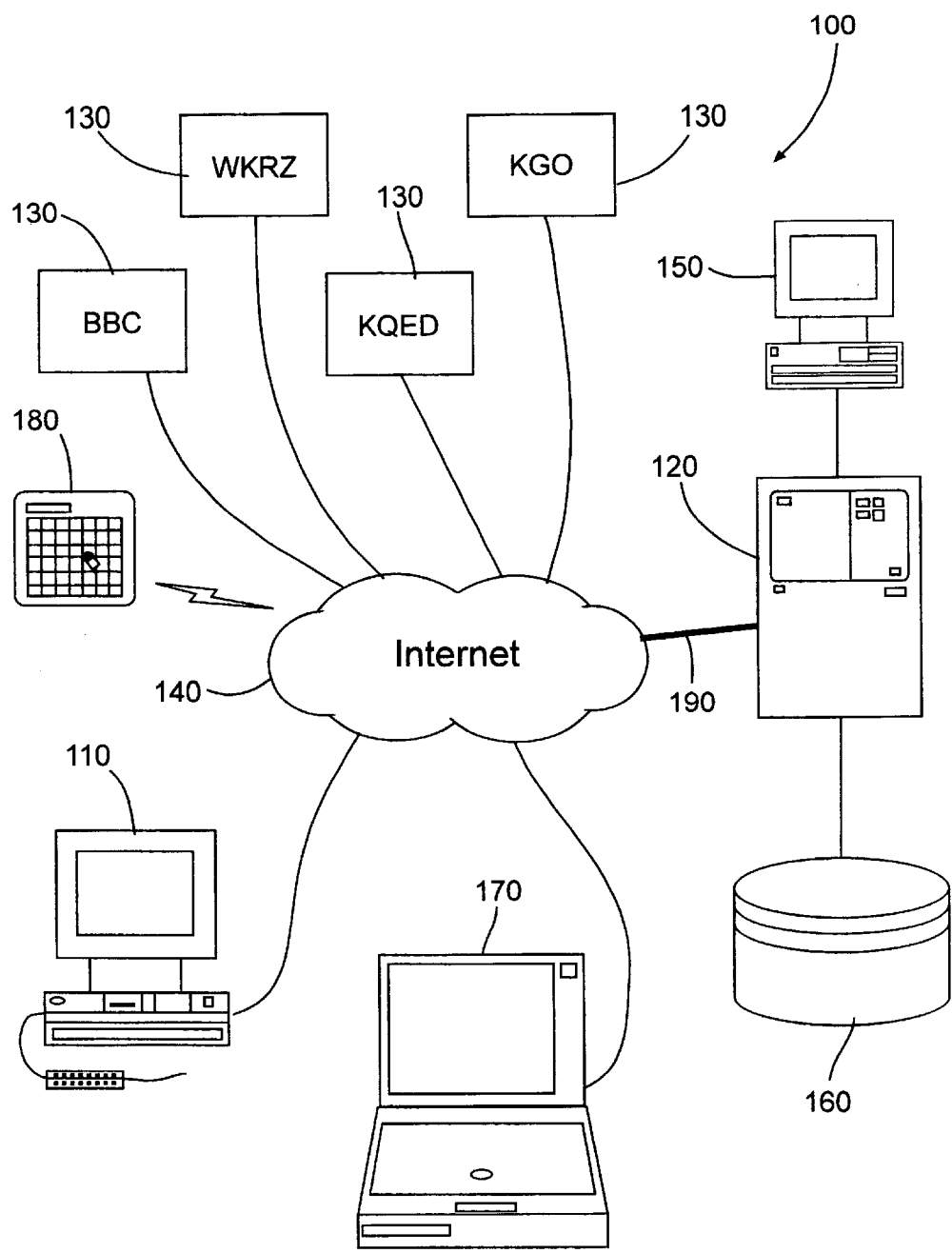
FIG. 1 is a simplified diagram of a network computer system according to an embodiment of the present invention.

FIG. 1 is a simplified diagram of a network computer system 100 according to an embodiment of the present invention. This diagram is merely an example, which should not limit the scope of the claims herein. One of ordinary skill in the art would recognize many other variations, modifications, and alternatives. FIG. 1 includes a client system 110, a server system 120, and content servers 130, coupled via a network 140.

Network 140 allows for communication between computers on network 140, such as a client system 110, or the like. In the present embodiment, network 140 may be, for example, a wide area network, the Internet, local area networks, intranets, and the like.

In the present embodiment, server system 120 may include a terminal 150 and a database 160. In embodiments of the present invention, server system 120 may comprise one or more physical servers, further, database 160 may be a distributed database, and the like. As will be described further below, a server system 120 may include data associating identifiers from client system 110 with uniform resource locators (URLs) of content servers 130, or with another server system 120 that may have the desired URL, or the like.

Client system 110 may be configured with many different hardware components and can be made in many sizes, styles and locations (e.g., laptop, palmtop, pen, server, workstation, mainframe, or the like). For example, a client system may be embodied as a lap top computer 170, a wireless computing device 180, or the like. Other examples of client systems may include, for example, a cellular phone, a personal digital assistant, a pager, an internet appliance, or the like.

Terminal 150 is typically directly coupled to server system 120. This connection can be by a network such as Ethernet, asynchronous transfer mode, IEEE standard 1553 bus, modem connection, universal serial bus, etc. The communication link need not be a wire but can be infrared, radio wave transmission, and the like. In turn, server system 120 is typically coupled to the Internet via a network connection 190. In the present embodiment, network connection 140 may be a relatively high bandwidth transmission medium such as a T1 or T3 line, but can also be others.

Network 140 is shown symbolically as a cloud. However, it is well known that such large computer networks actually include a large collection of server routers, computers, and other devices.

In an embodiment of the present invention, server system 120 and database 160 store data and disseminate the data to client systems over network 140. The concepts of "client" and "server," as used in this application and the industry, are loosely defined and, in fact, are not fixed with respect to machines or software processes executing on the machines. Typically, a server is a machine, e.g., or process that is providing information to another machine or process, i.e., the "client," e.g. that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a WEB site, which is an electronic site commonly on the World Wide Web ("WWW"), is often hosted by a server computer with a large storage capacity, high-speed processor and Internet link having the ability to handle many high-bandwidth communication lines.

In one embodiment, network 140 is coupled to a plurality of content servers 130. In this example, each content server 130 is associated with a broadcast radio station having conventional call letters, e.g., BBC, WKRZ, KQED, KGO. Each of these content servers 130 may be coupled directly to network 140 or through intermediary computers, such as client 110. Each of the content servers may be similar in design or may be different, depending upon the specific application.

In the present embodiment, content servers may also include a source library of music and/or spoken information, a pre-programmed audio web server, a connection to a broadcast radio station, or the like. The audio information is communicated across network 140 and to client system (client computer) 110. In the present embodiment, the audio information is typically converted into a digital streaming format for transmission through network 140. Various streaming formats may be used including Windows Media format, QuickTime format, Real Player format, and the like.

Further details of the processing hardware and software are discussed below and illustrated by the figures.

Figure 2:
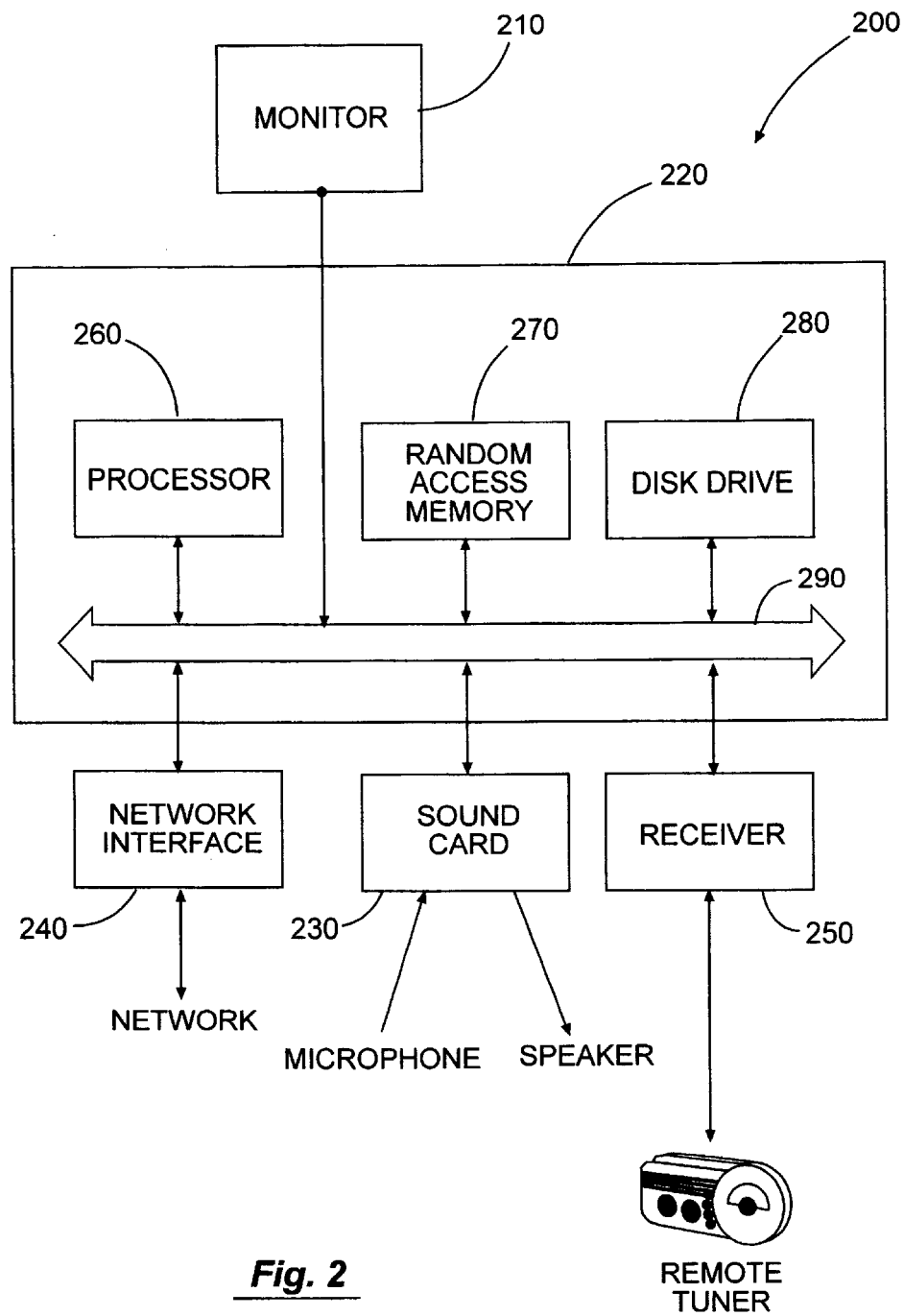
FIG. 2 is a block diagram of a typical computer system according to an embodiment of the present invention.

FIG. 2 is a block diagram of a typical computer system 200 (client) according to an embodiment of the present invention. Embodiments of client systems 110 may be embodied as computer system 200. Further, embodiments of servers 120 also may be embodied as computer system 200 with appropriate configuration.

In the present embodiment, computer system 200 typically includes a monitor 210, a computer 220, a keyboard, a sound card 230, a graphical input device, a network interface 240, and the like. In some embodiments, as a client system, computer system 200 may also include a receiver 250.

In this example, receiver 250 is typically used to receive data from a remote tuner, described further below. For example, receiver 250 may receive tuning instructions, button pushes, and the like. In embodiments of the present invention, receiver 250 may be coupled to computer system 200 via a computer bus 290, via a serial port, via a Universal Serial Bus (USB), wireless peripheral interface, or the like. In other embodiments of the present invention, receiver 250 may be a transceiver that can also send data to the remote tuner.

In the present embodiment, sound card 230 and speakers may be used for audio output of streaming data received from the Internet, audio output of data stored within computer system 200, or the like. Sound card 230 is a typical sound card available on most multi-media equipped computers. As is well known, sound card 230 typically includes analog to digital (AtoD) and digital to analog (DtoA) conversion hardware. In this embodiment, sound card 230 may be a sound card that includes processing hardware such as is available from Creative Labs, or the like. In an alternative embodiment, functionality of sound card 230 may be on the motherboard of computer 220. In embodiments of the present invention, microphones and speakers may be directly coupled to sound card 230 via dedicated connections, however in other embodiments, microphones and speakers may be coupled via serial buses such as the Universal Serial Bus (USB), or the like.

Graphical input devices are provided to allow a user at computer system 200 to graphically select objects, icons, text and the like that are displayed on monitor 210. As is well known, graphical input devices are operated in combination with cursors that are also displayed on monitor 210. In the present embodiment, a graphical input device is typically embodied as a computer mouse, a trackball, a track pad, wireless remote, and the like.

In the present embodiment, network interface 240 provides the interface for exchange of data between computer system 200 and a server. Such data typically includes text, graphics, streaming audio data, audio/visual data, and the like. Embodiments of network interface 240 include an Ethernet card, a modem (telephone, satellite, cable, ISDN), (asynchronous) digital subscriber line (DSL) units, wireless network interface, and the like. Network interface 240 is typically coupled to a computer network as shown. However, in other embodiments, network interface 240 may be on the motherboard of computer 220, may be a software program, such as soft DSL, or the like.

In the present embodiment, computer 220 includes familiar computer components such as a processor 260, and memory storage devices, such as a random access memory (RAM) 270, a disk drive 280, and system bus(es) 290 interconnecting the above components.

In one embodiment, computer 220 is a PC compatible computer having an x86 based microprocessor, such as an Duron™ or Athlon™ microprocessor from Advanced Micro Devices, Inc. Further, in the present embodiment, as a client system, computer 220 typically includes Windows98 operating system, and as a server, computer 220 may include WindowsNT operating system, both from Microsoft Corporation.

RAM 270 and disk drive 280 are examples of tangible media for storage of data, audio message files, computer programs, web browser software, voice communication protocol software, streaming media decoders, embodiments of the herein described invention, applet interpreters or compilers, virtual machines, web pages, databases and the like. Other types of tangible media include floppy disks, removable hard disks, optical storage media such as CD-ROMS and bar codes, semiconductor memories such as flash memories, read-only-memories (ROMS), and battery-backed volatile memories, and the like. In embodiments of the present invention, such as set top boxes, mass storage, such as disk drive 280, and the like may be dispensed with.

In the present embodiment, computer system 200 also includes software that enables communication via a packetized network such as those using the HTTP, TCP/IP, RTP/RTSP protocols, and the like. In alternative embodiments of the present invention, other software and transfer and communication protocols may also be used, for example IPX, UDP or the like.

FIG. 2 is representative of types of system for embodying the present invention. It will be readily apparent to one of ordinary skill in the art that many other hardware and software configurations are suitable for use with the present invention. For example, other types of processors are contemplated, such as the Pentium™ or Celeron™ microprocessor from Intel Corporation, Crusoe™ processor from Transmeta Corporation, PowerPC G3, G4 microprocessors from Motorola, Inc., and the like. Further, other types of operating systems are contemplated, such as Solaris, LINUX, UNIX, MAC OS 9 from Apple Computer Corporation, BeOS, and the like.

It will be appreciated that client systems may include a sub-set of the above components, a different set of components, reduced performance components in different embodiments of the present invention. For example, when computer system 200 is embodied as a PDA, network interface 240 may be a wireless network interface; processor 260 may be a processor such as a DragonBall™ processor from Motorola, a VR4121 processor from NEC; or the like.

Figure 3:
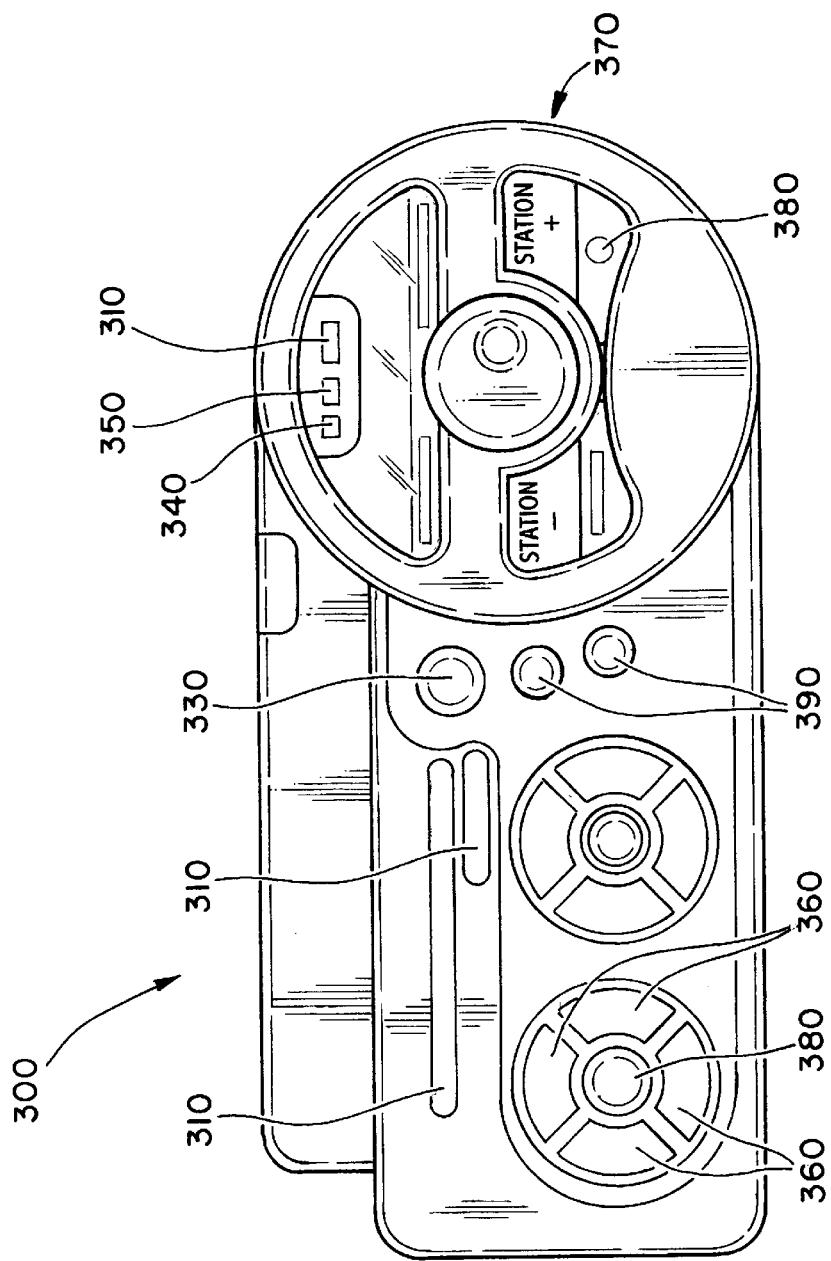
FIG. 3, illustrates a graphical user interface according to an embodiment of the present invention.

FIG. 3, illustrates a graphical user interface according to an embodiment of the present invention. In particular, FIG. 3 illustrates a monitor (display) of a graphical user interface (GUI) 300 on a client computer, such as client computer 110. In one embodiment, GUI 300 is embodied as Sonicbox™ iM™ Software Tuner. Client software embodying GUI 300 is available for download from the assignee of the current application.

By using GUI 300, a user can choose to receive data from a multitude of streaming media sources on the client computer. In one embodiment, the data include audio data, and the streaming media sources include on-the-Internet radio stations. In alternative embodiments, the data may also include visual data, graphics, or the like. Further, the streaming media sources may include on-the Internet television stations, on-demand audio/video sources, and the like. In this embodiment, the audio data that is received is output to the user, typically via speakers coupled to the client computer. In alternative embodiments, other types of audio output devices may also used, such as headphones, speakers coupled to a stereo system, and the like.

In the present example, GUI 300 includes displays 310. In this embodiment, displays 310 are used to display the name of an Internet-based radio station, the genre of programming, the format type, status, and other descriptive information. For example, the name may include the call letters, such as WGN, WLS, WBBM, or the like; the station number, such as AM 760, FM107.9, NOAA radio, or the like; the internet address may appear as http://wgnradio.com/listen/livewgn.ram, or the like. Further, the genre may include "talk radio", "sports radio", "all news", "public broadcast", or the like; and the format may include "mp3", Windows Media player format, Quicktime format from Apple Computer, Real Media format from Real Networks, and the like.

Further details regarding description of displays 310 may be found in co-pending U.S. patent application Ser. No. 09/578,993, filed May 25, 2000, titled "Improved User Display Method and Apparatus for Internet Radio". This application is incorporated by reference for all purposes.

In this embodiment, displays 310 may also include description information regarding the status of the playback process. For example, descriptive information may include the time elapsed on the track, the amount of time remaining in the track, the current time, the amount of time without a commercial break, a user-defined count-up or count-down timer, and the like.

In FIG. 3, displays 310 include media source tuning information including, a band 340, and a station 350. In the present embodiment, genres of streaming data are created, such as Jazz, Electronic, New Age, Oldies, Sports, and the like. Streaming media sources, for example, radio stations on the Internet are then classified by these genres. Radio stations, and the like, that are of the same genre are then assigned to the same band, as illustrated by band 340. As an example, FIG. 3 illustrates that, alternative music is categorized in band "A." Within each band, radio stations, and the like are uniquely identified by a station number, a channel number, or the like, as illustrated by station 350.

In the present embodiment, 26 unique bands are provided. Bands A–Y are typically pre-determined genres. Z band (or band Z) is reserved for user-selected stations. The technique of the user storing and retrieving stations from the Z band will be described in more detail below. In other embodiments, a larger number or a smaller number of bands may be provided. In other embodiments, bands may be nested in other bands to create a hierarchical structure of bands, leaf nodes in the tree may be the actual stations. In other embodiments, the organization of the bands may be represented by a ,directed acyclic graph of bands, wherein a band may contain both bands and stations.

In alternative embodiments of the present invention, the nomenclature may be reversed, and station 350 may specify the genre, and band 340 may specify the specific radio station of that genre. In still other embodiments, other classification of radio stations and the like may be made. For example, classifications may be made based upon where the radio station is located, for example, out-of state, in Australia, in Canada, or the like; the spoken language of the station, for example, French, English, Spanish, or the like; the "cost" of the station, for example, subscription radio stations, free radio stations, or the like; the broadcasting bandwidth of the radio station, for example 56 Kbps stations, 128 kbps stations, and the like. Other types of classification are envisioned in light of the present patent disclosure. In still other embodiments, a "flat" file structure may be used to store the radio stations. For example, all available radio stations may have a unique number from 1 to 1024, or the like.

In the present embodiment, 32 stations are provided for each band (A–Z). Not all 32 stations may be pre-assigned to different stations, however. In other embodiments, a larger number or a smaller number of channels may be provided.

In FIG. 3, icon 330 is provided to allow the user to store a station onto the Z band. In particular, if the user is listening to a station that she likes she may select icon 330. In response, the station is duplicated onto a band reserved for storing the user's favorite stations. In this example, the Z band is used to store that station identifier, although in other example, other bands may similarly be reserved. Later, in order to quickly access stations that the user likes, instead of dialing each band and each channel, the user may simply dial within the Z band to peruse her favorite stations. Further details regarding the techniques for storing and retrieving preferred channels will be described below.

In FIG. 3, icons 360 are provided to allow the user to select a particular band and icons 370 are provided to allow the user to select a particular station. Together, icons 360 and icons 370 are referred to as a tuning portion of GUI 300. As is well known, the user can use a graphical input device to select particular icons 360 and icons 370 on the display. For example, in FIG. 3, the user clicks upon icons 360 to change bands, e.g. to change from band A to B to C, and the like. In this embodiment, selection of the band wraps around, thus the A band and Z band are considered logically adjacent to each other.

In this example, the user clicks upon icons 370 (station+, station−) to change channels, e.g. to change from channel 24 to 23 to 22, and the like. In this embodiment, selection of the channel also wraps around, thus channel 32 is considered only one click away from channel 32.

As illustrated in FIG. 3, one icon 370 resembles a knob. In the present embodiment, the user uses the graphical input device to "rotate" the knob on the display. In response to the "rotation", the selection of the channels change. For example, by "rotating" the knob clock-wise, the channel number generally increases, similarly, "rotating" the knob on the display counter-clock-wise, the channel number generally decreases.

In one embodiment of the present invention, icons 360 may not be provided. Further, station+ and station− icons 370 may not be provided. In such an embodiment, all tuning is performed via graphical "rotation" of the knob icon 370. In this example, band A, channel 32 may be followed by band B, channel 1, and the like.

GUI 300 may also include icons 380. In the present embodiment, in response to user selection of icons 380 on the display, information may be given to the user. For example, in one embodiment, selection of icons 380 is translated into opening of a web browser and opening the home page of the radio station the user is listening to.

In other embodiments, selection of icons 380 opens a web page related to the current artist, for example, the artist's home page; in another embodiment, selection of icons 380 opens a web page regarding the subject matter being discussed, for example, if a Sierra Club executive is discussing de-forestation, a Sierra Club web page regarding deforestation may be opened; and in another embodiment, selection of icons 380 opens an e-commerce page where the user can purchase service or merchandise related to what is being played, for example, if a Cubs game is on, the Cubs home page may be opened.

In other embodiments of the present invention, selection of icon 380 may cause other actions to occur. For example, selection of icon 380 may cause an e-mail to be sent to the user including a coupon, a music clip, graphics, or the like; may cause a physical mail to be sent to the user; may cause the song to be played again; may request that the song be purchased and/or placed in a user library; and the like. Icons 380 may be referred to herein as "tell me more" buttons.

In the present example, GUI 300 also includes icons 390. Logically, icons 390 allow the user to give feedback regarding the current programming the user is listening (and/or viewing) to. For example, if the user likes a song she hears, she may select the smiley icon 390. In response to the selection of smiley icon 390, that input is returned to the server. In the server, the user's listening profile is built using this input. In particular, the user's likes and dislikes may be monitored.

In one embodiment of the present invention, based upon the user's listening profile, programming may be tailored. For example, when a station is about to play a song that the user has pressed a frowny icon 390 on previously, the server may switch streams to another radio station for at least part of the disliked song. After that song is completed, the server may switch back to the original station. In other embodiments, if a user presses smiley icon 390 when she hears a particular artist, the user may be referred to a web page where she can get a special deal on sale of that artist's CD, merchandise, other services, or the like.

In the present embodiment, the server receives feedback from many users regarding their likes and dislikes and stores this data. Later, this data can be used to give radio stations feedback regarding their programming; to give advertisers an indication of listenership of different stations; to give record companies an indication of which stations to release new material, and the like. Many other functions are contemplated in embodiments of the present invention in light of the present patent disclosure.

Other functional icons are contemplated in this and other embodiment of the present invention in light of the current patent disclosure. For example, as shown in FIG. 3, CD player controls are provided. By the user pressing appropriate control icons on GUI 300, a user may request playing of a CD from her CD-ROM, mp3 from her hard disk, and the like.

Figure 4:
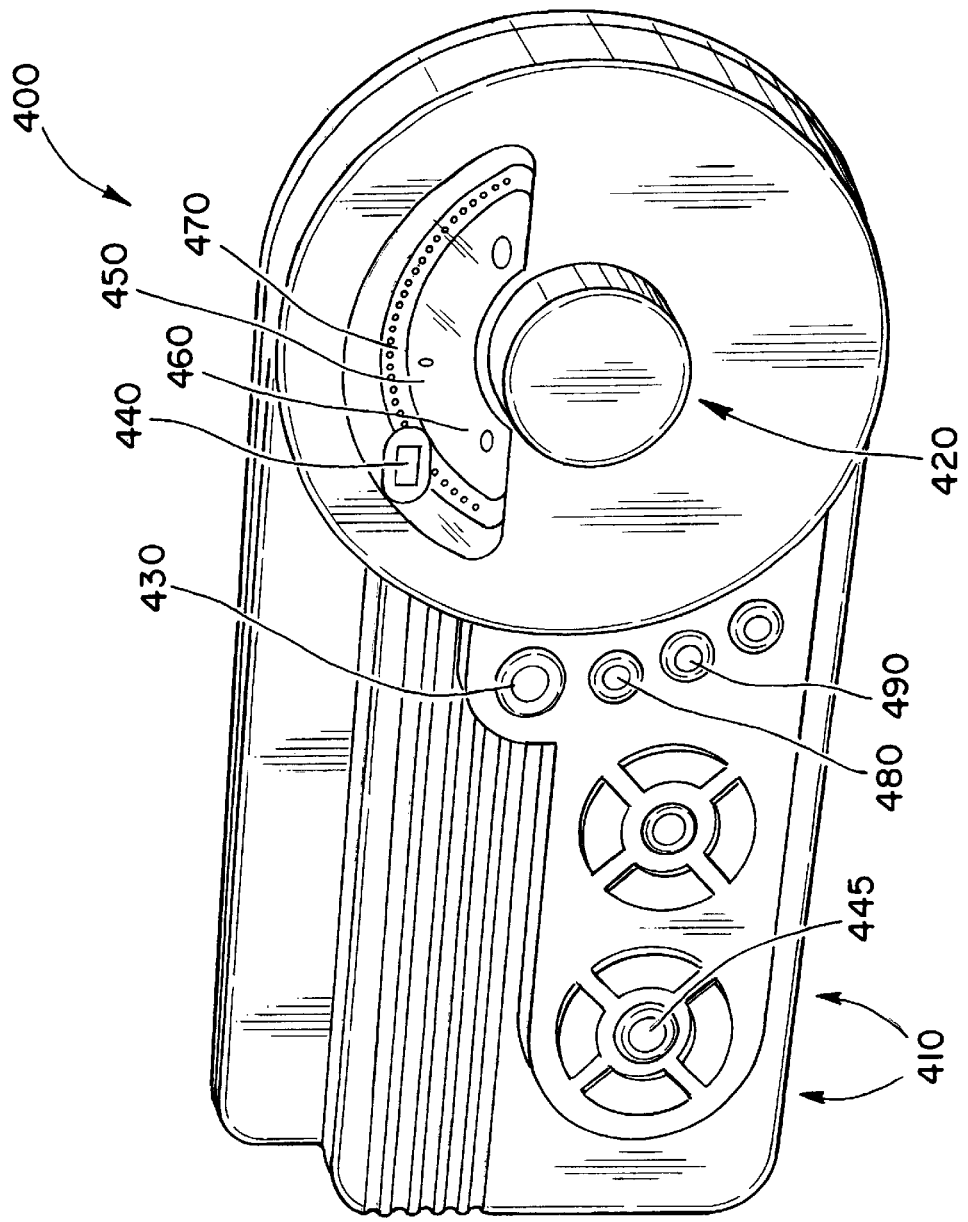
FIG. 4 illustrates another embodiment of the present invention.

FIG. 4 illustrates another embodiment of the present invention. In particular, FIG. 4 illustrates an embodiment of a remote tuner 400 as was described briefly in FIG. 2. Remote tuner 400 is typically coupled to a client computer within a user's home or work. Remote tuner 400 typically interacts with client software on the client computer. In one embodiment, the client software and remote tuner 400 are embodied as Sonicbox™ iM™ Remote Tuner and software, to become available for purchase from the assignee of the current application.

In the present embodiment, remote tuner 400 uses signals around 900 MHz to send data to receiver 250 (FIG. 2). In alternative embodiments, other methods for communication are contemplated. For example, in one embodiment, remote tuner 400 may be coupled via wires; in another embodiment, remote tuner may be coupled via a home wireless network, such as AnyPoint™ from Intel Corporation, or the like; and in another embodiment, remote tuner 400 may be coupled via FM signals, infrared or the like.

In the present embodiment, signals from remote tuner 400 are received by the client computer. In response, client computer processes the input in the same manner as though the user entered the input via GUI 300. In the present embodiment, appropriate software is provided on the user's computer that with remote tuner 400 to provide the functionality described above, and below.

In one embodiment of the present invention, the user may use both GUI 300 and remote tuner 400 to specify bands, channels, give feedback and the like. In alternative embodiments, GUI 300 and remote tuner 400 may be exclusive of each other.

Functionally, remote tuner 400 has many of the same functionality described above with GUI 300, for example, remote tuner 400 includes band buttons 410. In this example, user selection of band buttons 410 allows the user to switch between bands. As another example, remote tuner 410 includes a tuning knob 420. In this example, when the user rotates the tuning knob 420, the current channel is changed. In alternative embodiments band buttons 410 are not included, and tuning know 420 is used to tune the band and the channel.

The embodiment in FIG. 4 also includes button 430. Similar to icon 330, above, when the user hits button 430, the current station the user is listening to is saved onto a user band (band Z). Later, the user can simply tune into the Z band to peruse her favorite channels. Further description regarding the technique for storing and retrieving desired stations will be described below.

As illustrated in FIG. 4, display 440 and display 450 are provided on remote tuner 400. In the present embodiment, display 440 includes a display of the band and the channel the user is presently requesting the server to provide. Further, display 450 is a graphical representation of the band and the channel the user is requesting. As can be seen, a small hand 460 graphically indicates the band, band A, and a large hand 470 graphically indicates the channel, channel 15.

In the present embodiment, smiley button 480, frowny button 490, and a "tell me more" button 495 are also provided. The functionality of these buttons are typically similar to that described above with icons 380 and 390, above. In particular, selection of these buttons may provide benefits to the user and provides feedback to the server. For example, in response, the user may be sent special coupons or target advertisements related to the programming, the user may hear the programming again, and the like. Further, in response, the feedback from the user or users may be used to determine listenership, may be used to determine unpopular stations, may be used to set advertising rates, and the like. In alternative embodiments, the functionality of the icons on GUI 300 and Remote Tuner 400 may be different.

Figure 5A:
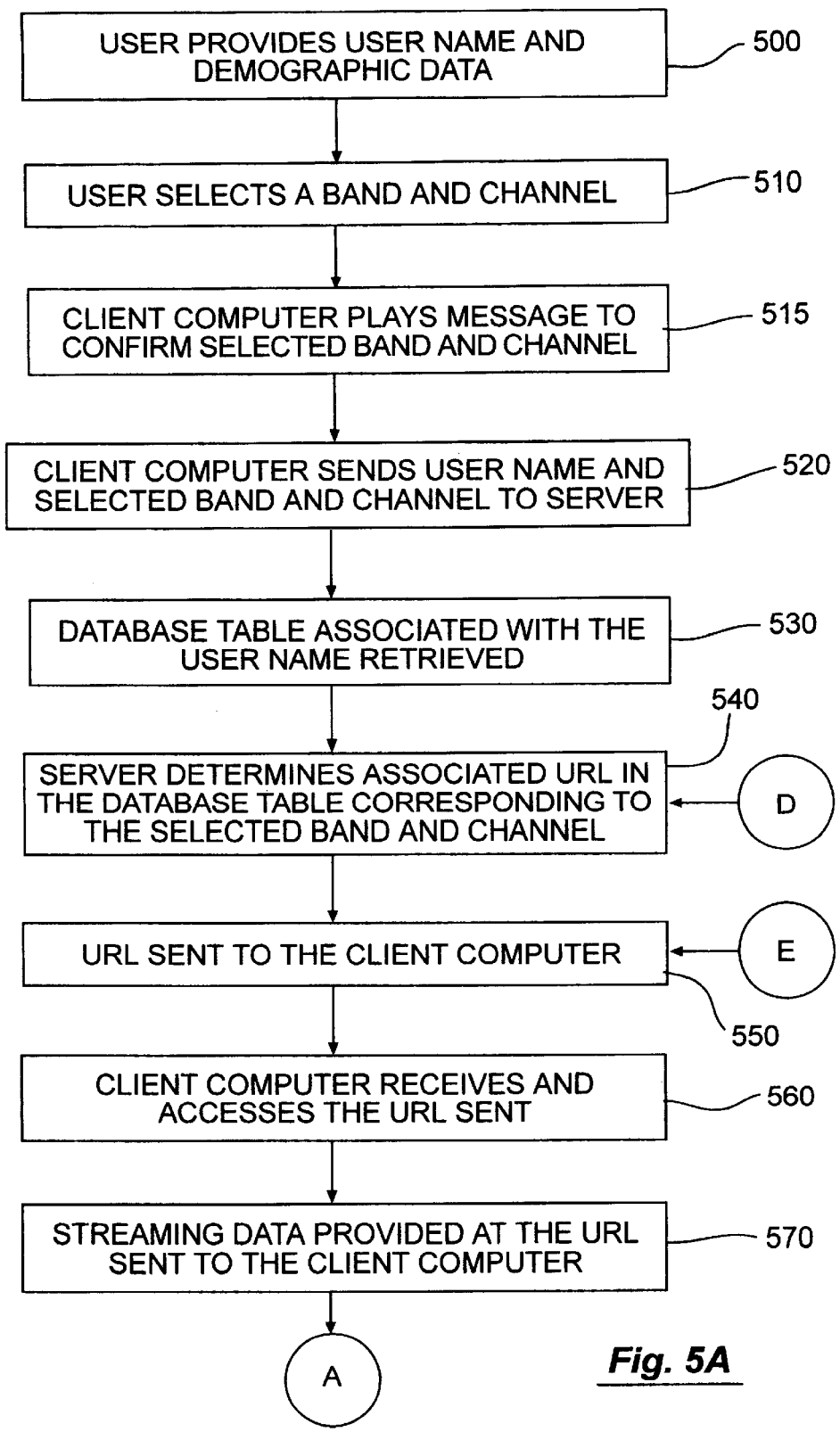
FIGS. 5A–C illustrate a block diagram of a flow chart according to an embodiment of the present invention.
Figure 5B:
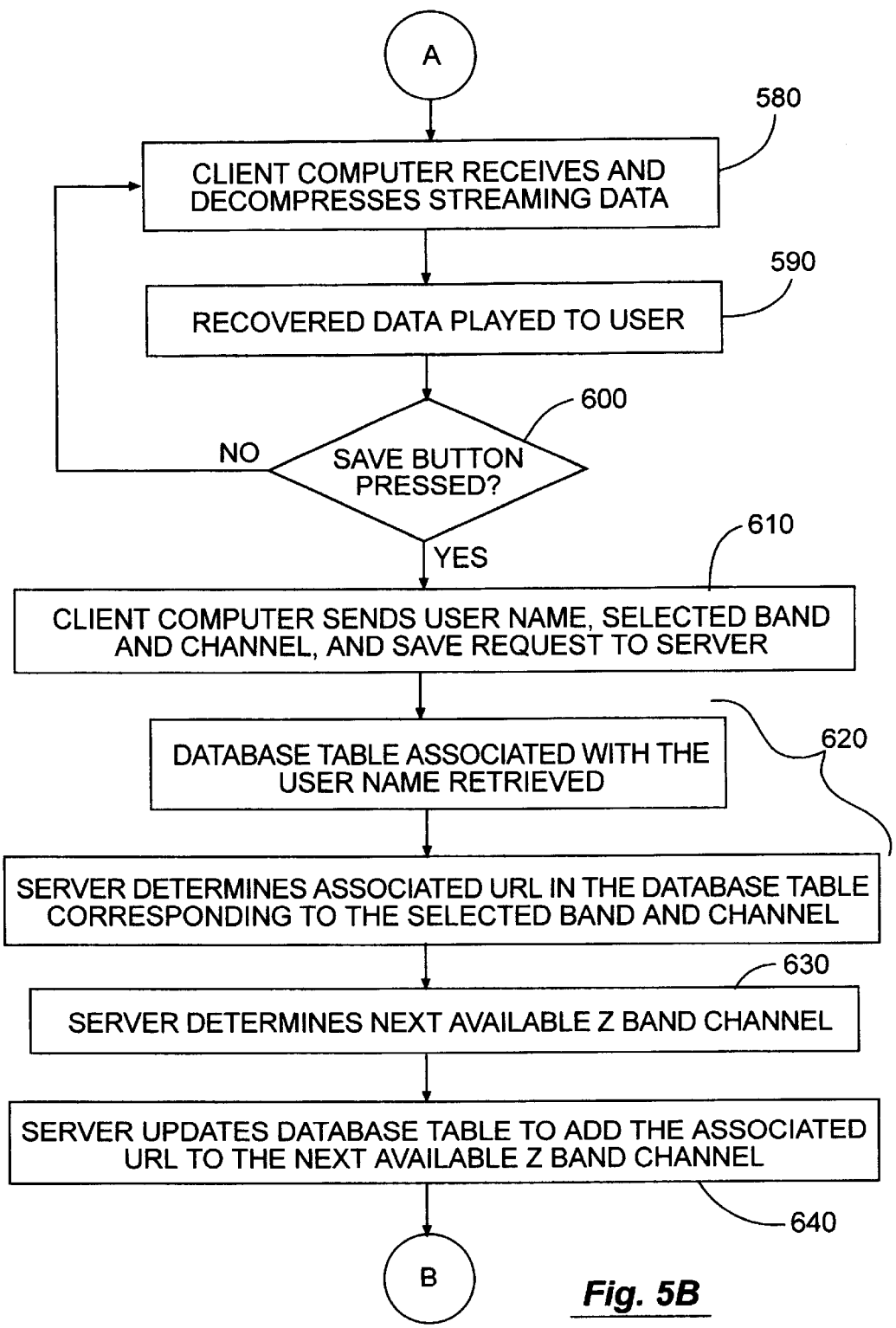
Figure 5C:
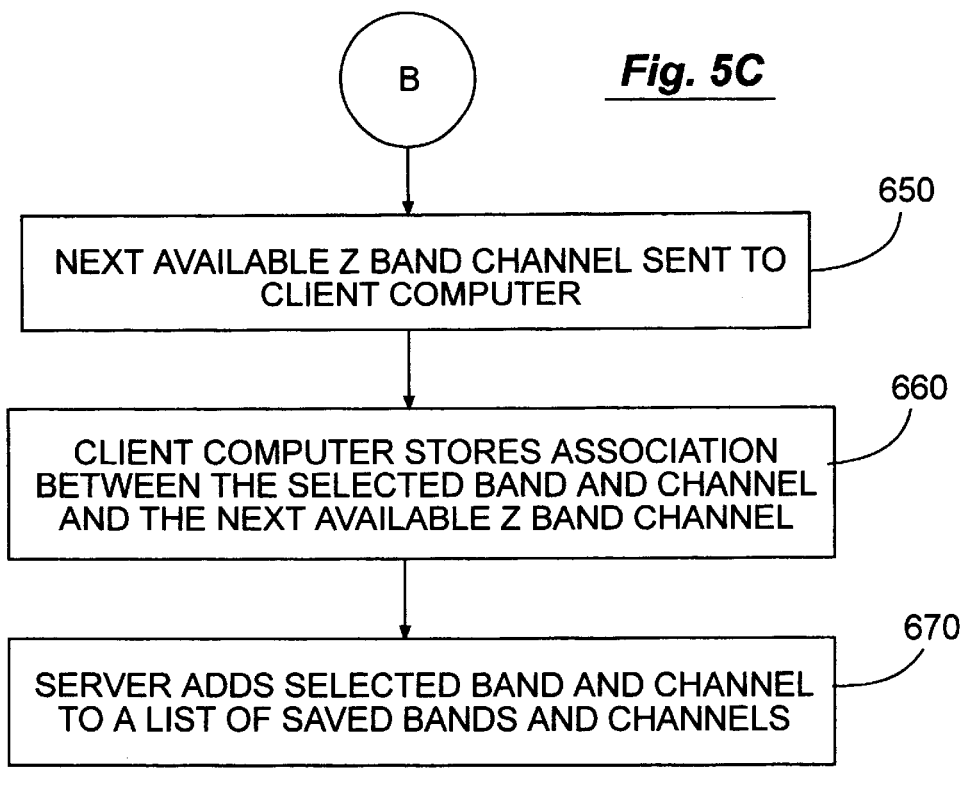

FIGS. 5A–C illustrate a block diagram of a flow chart according to an embodiment of the present invention. In particular, FIGS. 5A–C illustrates a technique for storing user-selected stations using client software and GUI 300 and/or using remote tuner 400 in combination with client software on the client computer.

After invoking the client software, the user sends her user name, or the like to the server, step 500. In the present embodiment, the user may first manually register with the server in response to prompts from the server. For example, the server via a web page, or the like may prompt the user for her name, a user identification, age, demographic data, a list of her interests, password, payment information, or the like. Typically in response, the user enters such data via a web browser, or the like, and the data is submitted as a form to the server. In alternative embodiments, the user may have an account already filled-out for her, based upon data gathered from other sources, thus registration may not be needed.

In other embodiments of the present invention, the client software or the client device sends an identifier associated with the user automatically when the client is powered-up or initiated. In such embodiments, a returning user does not have to manually enter a user name when the client is activated.

The user information, and the like may be stored via cookies, registry entry, or the like on the client computer. In such a case, upon subsequent use of the client software, the user name, log-in information, or the like may be automatically retrieved by the server. For example, upon power-up of remote tuner 400 and activation of the client software, the user information may automatically be sent to the server. In alternative embodiments, the user may manually log-in each time. In still other embodiments, different users using the same client computer may have their own account, thus individually they can log-in to their accounts. In other embodiments, the user simply starts the client software and the client software communicates with the server using an identifier which was generated by the server on the basis of prior requests made by the client when the client software was installed.

Next, the user selects a particular station to listen to, step 510. As illustrated in FIG. 3, the user typically performs this by selecting icons 360 and icons 370 (the tuner portion of GUI 300). For example, the user can select a particular band to listen to (genre) by selecting icons 360 (band+, band−) in the tuner portion. Further, the user can select a particular channel to listen to (station) by selecting icons 370 (station+, station−, tuning knob). When using remote tuner 400, the user can use buttons 410 and tuner knob 420 to specify the band and channel, respectively.

After the tuner data has been determined, the client computer outputs the tuner data to the user, step 515. In one example, the client computer determines one or more audio messages associated with the band and channel. These audio messages are then played to the user via speakers, headphones, or the like, coupled to the client computer.

In one embodiment, these audio messages are termed "pre-roll" messages, as they are played before the audio programming begins. As an example, the user tunes in band B (a classical music band), and channel 31 (radio station WFMT), in response, the client computer may retrieve audio files that can be assembled and played to the user in the following order: "Classical music, WFMT". In other embodiments, other pre-roll messages may also be played, for example, "Band B, channel 31", "Classical band B, channel 31, WFMT", or the like. Many similar types of audio cues can be output to the user to confirm a selection of a band and a station. Further, in other embodiments, audio cues may be used to confirm other types of user selections on GUI 300 or remote tuner 400.

The client computer then sends the data to the server, step 520. In this example, the data includes a band selection and a channel selection, as discussed above, and the user name, user ID, internal identifier, and the like. In alternative embodiments, additional information may be provided, such as the bandwidth of the connection, IP data, and the like. In still other embodiments, only the band and channel selection is provided. Many alternatives are envisioned. In the present embodiment, the data are packetized and sent back to the server using TCP/IP protocols, or the like.

On the server side, based upon the user name or information, data associated with the user is accessed from a database, step 530. In the present embodiment, the database includes a table that maps tuner data into actual uniform resource locators, URLs, and the like. As discussed above, in the present embodiment, tuner data includes a selection of a band and a selection of a channel. For example, the table may include data such as: band A (jazz), channel 1 is associated with URL: "http://208.133.73.201/nightgrooves2.asx"; band A, channel 2 is associated with URL: "http://www.phoenixradionet.com/streams/jazz.ask"; and the like.

Next, based upon the band selection and the channel selection the server determines a specific URL, step 540. For example, if the user specified band A, channel 2, the server identifies URL "www.phoenixradionet.com/streams/jazz.ask". In alternative embodiments, the server may return data associated with the URL, for example data may include a login, a password, a referrer identifier, or the like. For example, a subscription or fee-based station, or the like may require login data. The URL and associated data are packetized and sent back to the client computer, step 550. Alternatively, the client request is simply redirected to the URL specified by the server's response.

Once the client computer receives the URL and associated data, the client computer contacts the web site specified by the URL, step 560. In addition, at the same time, or after, the associated data may be sent to the web site.

In the present embodiment, after successfully authentication, the web site provides streaming media data to the client computer, step 570. In the present embodiment, discussion regarding media has focused upon audio data. However, in alternative embodiments, the streaming media data may include visual data, video, graphics, and the like in addition or instead of audio data. In such embodiments, the web site provides audio/visual data to the client computer. In the present example, the streaming media data is typically encoded prior to transmission to the client computer.

Next, when the client computer receives the streaming media data, the client computer decodes the data, step 580. In embodiments of the present invention, many different types of streaming media encoding/decoding schemes are contemplated. For example, formats may include those appropriate for the Windows Media Player, Quicktime, Real Player, and the like. In other embodiments, many other schemes for encoding and decoding streaming media are contemplated.

The data recovered is then played out via the client computer, step 590. In one embodiment, the data includes audio data, which is played out to speakers, headphones, and the like, coupled to the client computer. In another embodiment, the data may include video data, which is played out to a display or external monitor coupled to client computer, and the like. In this example, the data played out via the client computer is a radio station that the user wishes to listen to.

In the present embodiment, if the user likes the particular "radio station" and wants to add or "save" that station to her preferred list, the user selects icon 330 on GUI 300 in FIG. 3, step 600. In another embodiment, the save request is initiated via the user selecting button 430 on remote tuner 400 in FIG. 4. In the present embodiment, as will be discussed further below, the user's preferred list resides on band Z, and the added station is assigned a channel on the Z band.

In response to the save request, the client computer sends the server the save request, the current band selection, the current station selection, and the user identification, step

610. In alternative embodiments, different types of information may be sent, for example, the client computer may simply send the save request, the client computer may simply send the user identification, or the like. In this embodiment, the current band selection and current station selection may be the same ones sent to the server in step 520, above. By providing these values again, the server need not keep track of the current channel or band the user is receiving.

Next, the server receives the data and determines the URL in response to the current band selection, the current band selection, and the user information, step 620. As discussed above, in step 530 and 540, above, the server first determines a table associated with the user. Next, the server looks-up the URL associated with the current band and channel selection. As an example, if the user is currently listening to band A, channel 1, the URL "http://208.133.73.201/nightgrooves2.asx" may be determined.

In this embodiment, the server again refers to the table associated with the user to determine the next available Z band channel, step 630. For example, the server may refer to the table associated with the user to determine whether there are any URLs, or the like associated in all Z band channels. Once a channel on the Z band is located that does not currently have an associated URL, or the like, that channel is used as the next available Z band channel. In one example, if the user is pushing the save button for the first time, channel 1 of the Z band is the next available channel. As another example, if the user has already saved 5 channels on the Z band, the next available Z band channel is channel 6. In alternative embodiments, different methods for determining and assigning channels within the Z band are contemplated.

Next, the server associates the URL determined in step 620 with the Z band channel determined in step 630 and with the user name, step 640. In the present embodiment, the table of cross-references between bands/channels and URLs, is updated to reflect this new association. In embodiment of the present invention the term user name is also known as a log-in name, user profile name, profile identifier, and the like. As will be discussed further below, when the Z band channel associated with a user name is subsequently requested by another client computer, the server retrieves the URL associated the Z band and channel.

In another embodiment, the server associates the current band and channel determined in step 610 with the Z band channel determined in step 630 in the table. As will be discussed further below, when the Z band channel is subsequently requested by the client computer, the server first retrieves the associated band and channel information, then server retrieves the URL associated with the associated band and channel information. In another embodiment, the URL of the current band and channel is directly stored in association with the Z band channel.

In one embodiment of the present invention, the server then sends the Z channel information back to the client computer, step 650. In response, the client computer maintains the association between the current band and channel with the Z band and Z channel received for the particular user name, log-in name, or the like, step 660. For example, the user may be on J band, channel 25 when she pushes the save button. In response, the server determines that that channel should be saved onto the channel 16 of the Z band. In this example, the client computer would then associate Z band channel 16 to J band channel 25. As will be discussed further below, when the user subsequently selects Z band channel 16, the client computer knows that what is really desired is J band, channel 25. Accordingly, the client computer inserts a pre-roll announcement of "J band, channel 25".

In another embodiment, instead of the client sending back the Z band channel information, based upon a list maintained in the client computer, the actual channel and band are sent to the server. For example, in the example above, the client computer merely sends to the server "J,25".

In one embodiment of the present invention, the server monitors a list of stations (via channels and bands) that are saved onto the Z band, step 670. This enables the server to keep track of which stations, presumably, appeal to listeners. Based upon such data, stations that have small number of save selections may be dropped. Further, for advertising revenue purposes, stations that have a large number of save selections may command higher priced advertising spots.

The save selections may also be correlated to demographic profiles of listeners. In such a case, stations can position themselves to target particular demographic groups. Many other types of marketing and sales related information may be drawn from the above save requests. Use of such information is contemplated in different embodiments of the present invention.

In some embodiments, steps 630 and 650 need not be performed. In such embodiments, the client computer may keep track of the Z band channels that are available. Thus, when the user presses the save button, the client computer may determine and send to the server, the Z band channel where the station should be saved under.

Figure 6A:
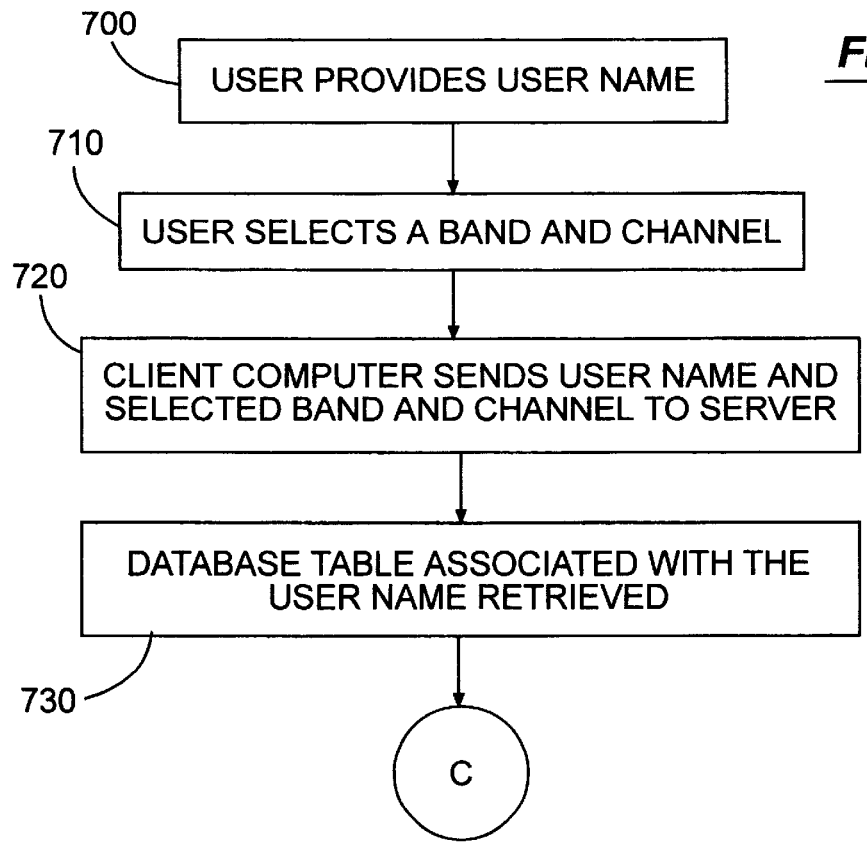
FIGS. 6A–B illustrate a block diagram of a flow chart according to an embodiment of the present invention.
Figure 6B:
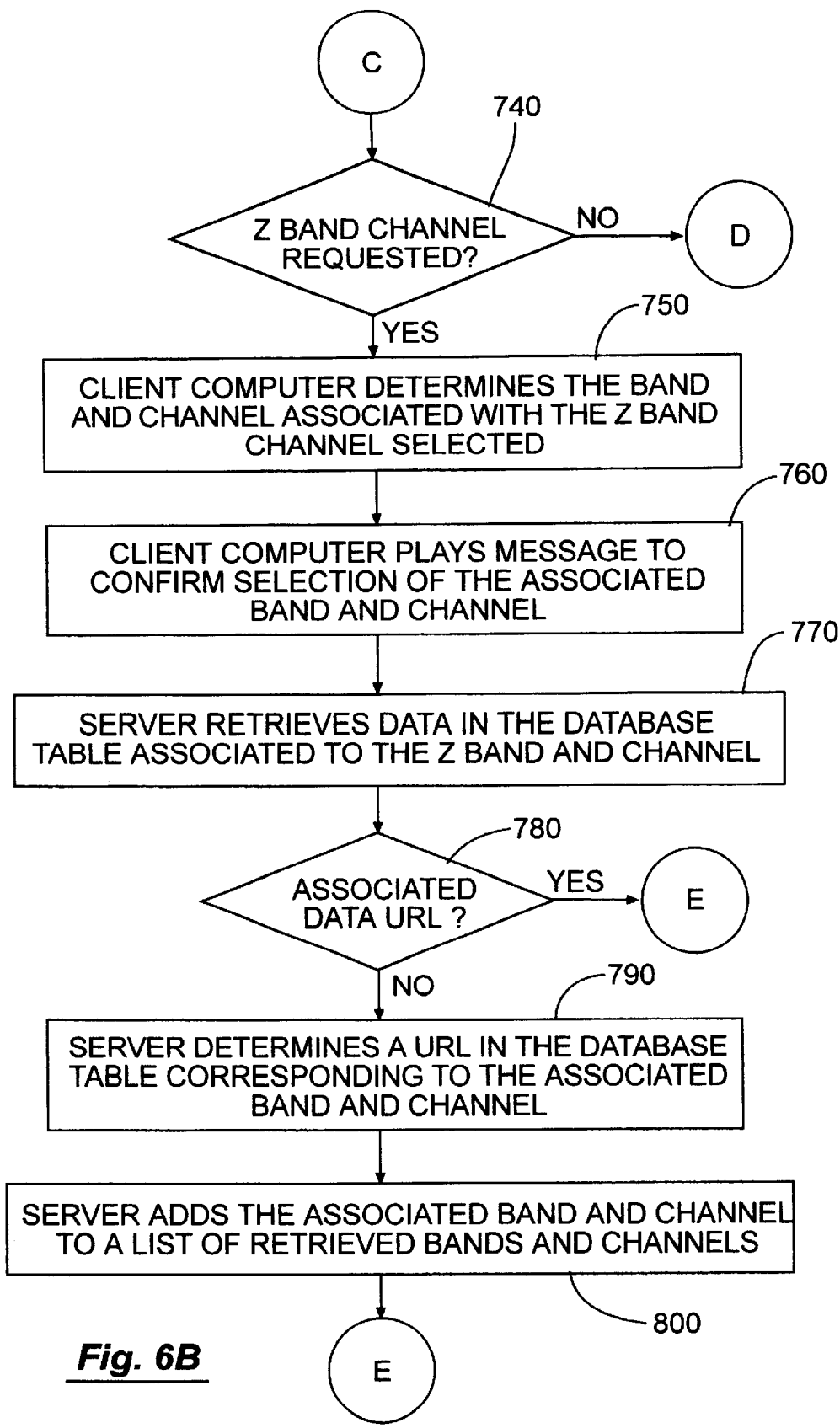

FIGS. 6A–B illustrate a block diagram of another flow chart according to an embodiment of the present invention. In particular, FIGS. 6A–B illustrate a technique for retrieving selected stations using client software and GUI 300 and/or using remote tuner 400.

Similar to FIG. 5, above, after invoking the client software, the user sends her user name, log-in name or the like to the server, step 700. In the present embodiment, because the user is typically a repeat user, the user need only enter a user name and/or password. Alternatively, such data are stored within cookies or a registry, thus the user need not log-in manually.

In one embodiment, the user may invoke the client software on a machine other than their "regular" client computer. For example, the user may be at a friend's house, or the like. In such an embodiment, when the user logs in, she can retrieve her favorite stations, stored on the Z band, from any client computer.

In other embodiments a first user defines associations between radio stations, or the like onto a Z band. The first user can use the technique in FIGS. 5A–C to perform this step. Next, a second user can enter the first user's user name, log-in name, or other identifier associated with the first user, to the server. If the server recognizes the first users log-in name, password, or the like, the second user has access to the stations saved by the first user onto the Z band.

An a example of, a professor locates a web radio station that broadcasts important speeches of the 20th century. The professor assigns that web radio station to her Z band, for example Z,6. The professor then gives her students her log-in name, password, group name, or the like, and tells them to listen to channel Z,6 before the next class. Students can then log-in as the professor or as a guest of the professor and tune-into channel Z,6, using the method described below. The following week, the professor may assign a different web radio station to channel Z,6.

As mentioned above, in one embodiment of the present invention a group of users may be able to store and retrieve links stored by other group members. These communities of users may share common interests, the same medical conditions, may be taking the same class, and the like. In one embodiment, a personal user name, log-in ID, or the like will have community membership associated therewith. For example, a user may be able to access her personal Z band links, as well as links set by members of a special interest group.

Next, the user selects a particular station to listen to, in the same manner as described if FIG. 5, step 710. The user may perform this action by selecting icons 360 and icons 370 (the tuner portion of GUI 300). For example, the user can again select a particular band to listen to (genre) by selecting icons 360 (band+, band−) in the tuner portion. Further, the user can also select a particular channel to listen to (station) by selecting icons 370 (station+, station−, tuning knob) in the tuner portion. When using remote tuner 400, the user can use buttons 410 and tuner knob 420 to specify the band and channel, respectively.

The client computer then sends the tuner data to the server, step 720. In this example, the data includes a band selection and a channel selection, as discussed above, and the user name. Other embodiments may include different information, as discussed above. For example, a first user may want to log in as a guest of a second user so the first user can listen to the second users' saved Z band stations. In the present embodiment, the data are packetized and sent back to the server using TCP/IP protocols, or the like.

On the server side, based upon the user name (log-in name) or information, data associated with the user is accessed from a database, as described above, step 730. In particular, a table that maps tuner data into actual uniform resource locators, URLs, and the like is retrieved. In this embodiment, the table also includes mapping information from Z band Z channel selections. The mapping may be to URLs, to other bands and channels, and the like.

In the present embodiment, the server then determines whether the tuner data received from the client includes a selection of the Z band, step 740. If not, the method may continue with step 540, in FIG. 5A, where the URL corresponding to the associated band and channel is determined. If so, the method continues, as described below.

In this example, if the tuner data includes a selection of a channel in the Z band the client computer determines an associated band and channel for that log-in name, user name, or the like, step 750. In this embodiment, the client computer has previously stored the association between a desired channel and band selection and a Z band channel for a particular user in step 660, in FIG. 5. Thus in this step, if the client computer has these associations for a particular user name, the client computer recalls the association. In the example in step 660, above, the client computer associated Z band channel 16 to J band channel 11 in association with a first user name. Thus in the present step, if the first user name is entered and if the tuner data includes a selection of channel 16 in the Z band, the client computer retrieves channel 11 of the J band.

In an alternative embodiment of the present invention, step 750 occurs before step 720. In such an case, the tuner data from the client computer to the server will include the actual tuner data (e.g. J band, channel 25) and not the Z band data.

After the client computer has identified the associated channel, the client computer plays an audio message to the user, step 760. In the present embodiment, the audio message includes messages confirming to the user that the associated channel has be selected. For example, messages such as "Band J, channel 11"; "New Age Station, WXRT"; and the like may be played. These types of messages are termed "pre-roll" messages. These messages are typically played before the audio programming, or the like from the desired source begins. If the association is not identified for the given user name, the message played may reflect the current Z band channel, for example, "Z, 16" and not "J,11".

In the present embodiment, in response to the tuner data from the client computer, i.e. a selection of a channel in the Z band, the server retrieves the association stored in the database table, step 770. In one embodiment, if the selection of the Z band channel is associated with a URL in the table, step 780, that URL is provided back to the client computer in step 550, in FIG. 5A.

If the selection of the Z band channel is associated with another channel in another band in the table, the associated band and channel are retrieved. For example, in response to Z band, channel 16, J band, channel 11 is retrieved. Next, the URL corresponding to the other band and other channel is retrieved from the table, step 790.

In one embodiment of the present invention, the server monitors a list of stations (via channels and bands) that are requested from the Z band, step 800. This enables the server to keep track of which stations appeal to listeners. Based upon such data, stations that have low repeat selections may be dropped from the programming choices. Further, for advertising revenue purposes, stations that have a high repeat selection may command higher priced advertising spots.

The repeat selections may also be correlated to demographic profiles of listeners. In such a case, stations can position themselves to target particular demographic groups. Many other types of marketing and sales related information may be drawn from the above save requests. Use of such information is contemplated in different embodiments of the present invention.

In the present embodiment, the method continues with step 550, in FIG. 5A, where the URL corresponding to the associated band and channel is determined.

Figure 7A:
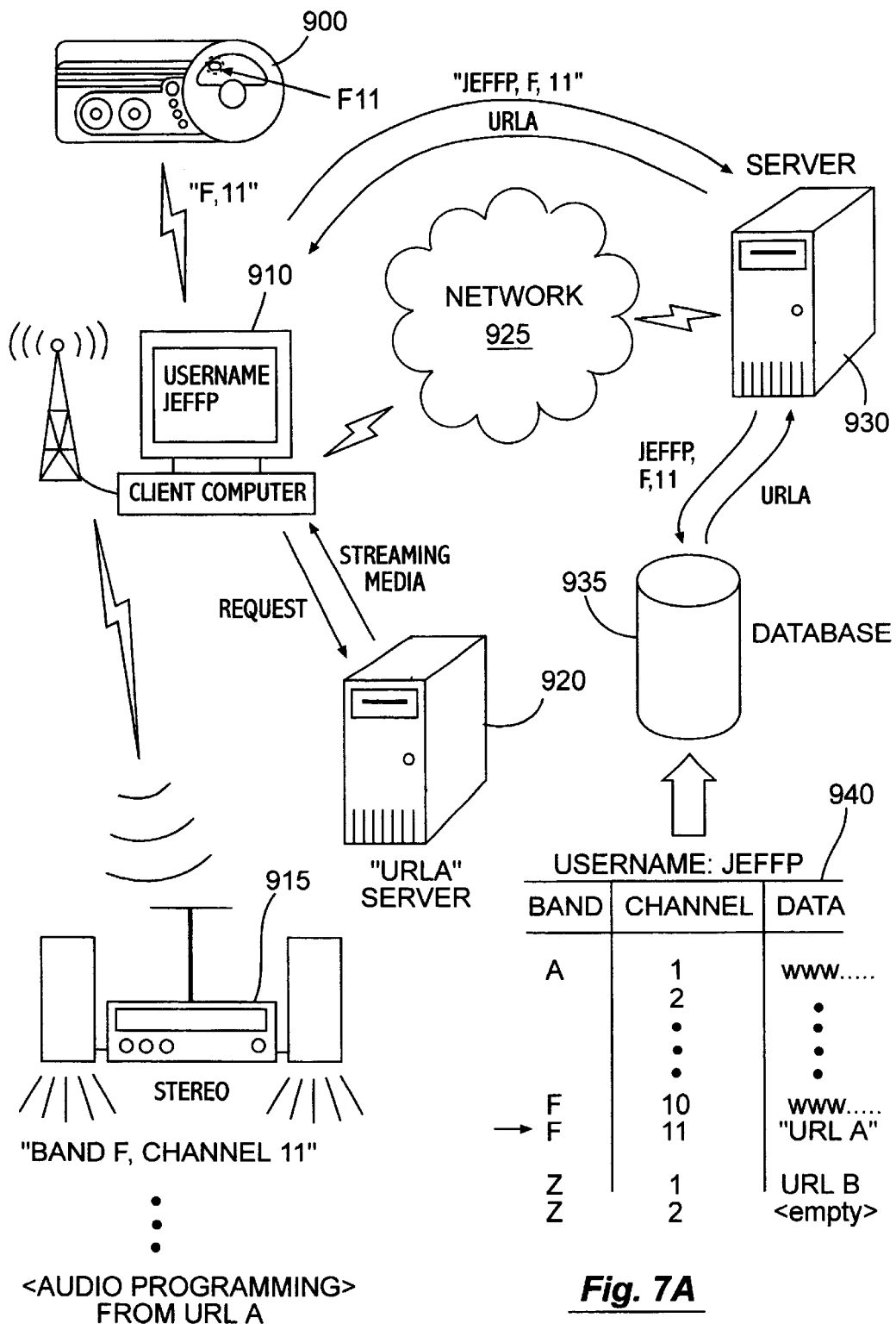
FIG. 7A illustrates an example of an embodiment of the present invention.

FIG. 7A illustrates an example of an embodiment of the present invention. In particular, FIG. 7A illustrates the exchange of data between a remote tuner 900, client computer 910, a content server 920, and a server 930, during normal operation.

In FIG. 7A, the first user at remote tuner 900 tunes in the F band, station 11. In response, remote tuner 900 sends "F,11" or the like to client computer 910. In turn, client computer 910, may play a pre-roll message, such as "Band F, Channel 11", to the first user via the stereo speakers of a stereo 915. At the same time, client computer 910 sends the first user name, for example "JeffP", and the tuner data "F,11" to server 930. In response to the data from client computer 910, server 930 accesses an entry indexed by "F,11" in a database table 940. In this example, data associated with F,11 is "URL A".

Next, server 930 sends back "URL A" to client computer 910 via a network 925. Client computer 910 then accesses content server 920 that has the address "URL A" In response, server 920 provides streaming media data to client computer 910. Client computer 910 decodes the stream of data and then plays the audio programming to the first user.

Figure 7B:
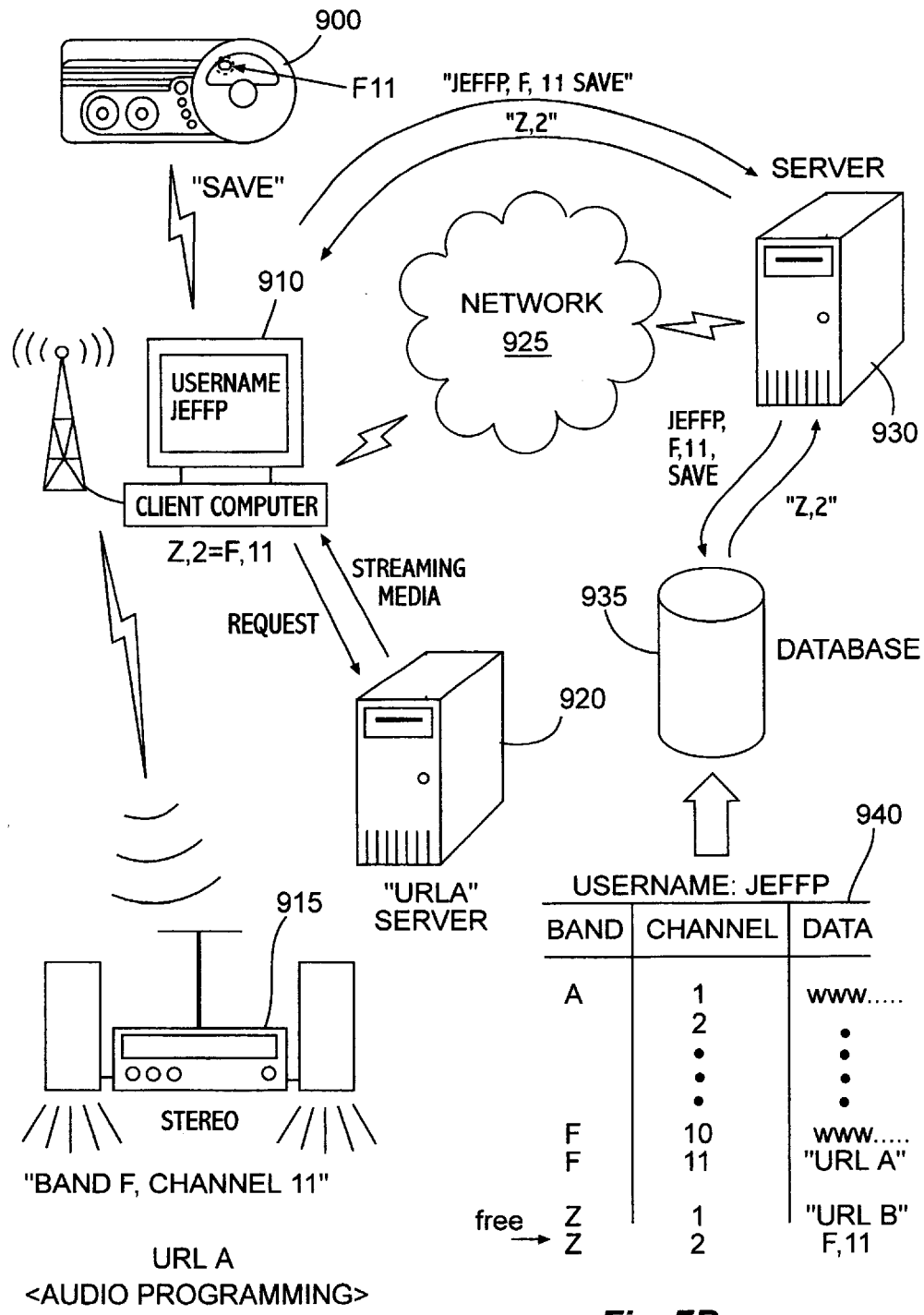
FIG. 7B illustrates an example of another embodiment of the present invention.

FIG. 7B illustrates another example of an embodiment of the present invention. In particular, FIG. 7B illustrates the exchange of data between a remote tuner 900, client computer 910, a content server 920, and a server 930 during a save command.

In FIG. 7B, the first user is listening to an audio program from URL A. When the first user likes the audio programming, the first user selects the save button on remote tuner 900. In response, client computer 910 sends the first user name, current band, current station, and save command to server 930. Server 930 accesses the database table 940 associated with the first user name to determine the next available Z band channel. In this case "Z,2" is available.

In this embodiment, server 930 then stores "F,11" in association with "Z,2" and sends "Z,2" back to client computer 990. In response, client computer 990 may also store the association between "Z,2" and "F,11".

Figure 7C:
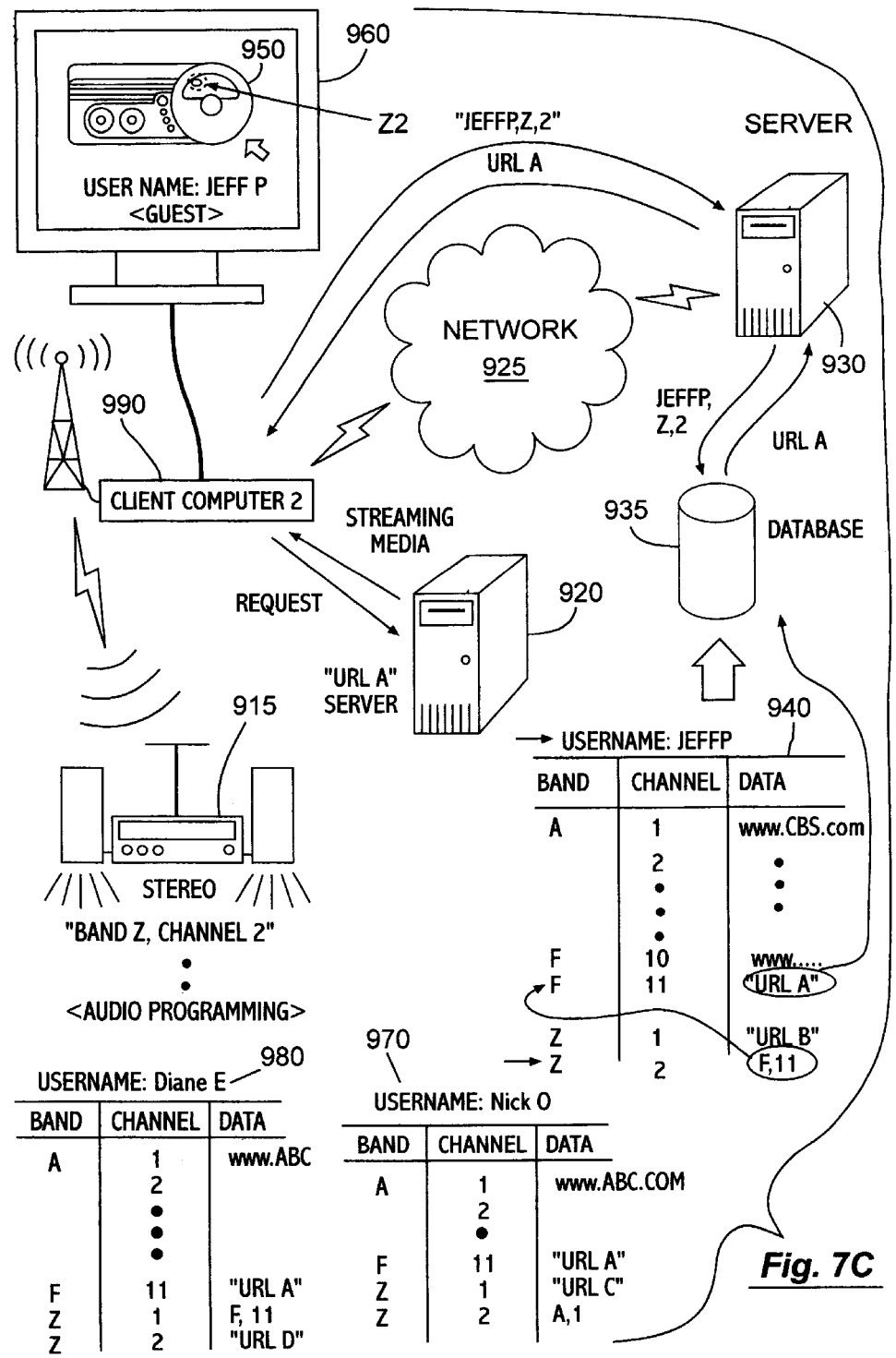
FIG. 7C illustrates an example of another embodiment of the present invention.

FIG. 7C illustrates another example of an embodiment of the present invention. In particular, FIG. 7C illustrates the exchange of data between a GUI 950, client computer 990, a content server 920, and a server 930 during a Z band selection.

In FIG. 7C, a second user a graphical user interface 950 tunes in the Z band, station 2 on display 960 of the client computer 990. In this example, client computer 990 does not know an association of "Z,2" for the user name "JeffP", thus, client computer 990, may play a pre-roll message, such as "Band Z, Channel 2", to the user via the stereo speakers. At the same time, client computer 990 sends the user name, such as "JeffP", and the tuner data "Z,2" to server 930. In response to the data from client computer 990, server 930 accesses a database table 940 for JeffP. In this example, data associated with "Z,2" is "F,11".

Next, Server 930 looks up "F,11" in database table 940 and determines the content server address is "URL A". Server 930 sends back "URL A" to client computer 990. Client computer 990 then accesses content server 920 that has the address "URL A" In response, server 920 provides streaming media data to client computer 910. Client computer 910 decodes the stream of data and then plays the audio programming to the user.

As illustrated, the database 935 in server 930 may include tables of associations for other users. For example if the second user at client computer 990 entered the username (log-in name, profile identifier, user identifier) "NickO", and channel Z,2, the database would return A,1 to server 930. In response, server 930 looks up A,1 in the table to determine URL: "www.abc.com", for example. Server 930 would then return "www.abc.com" to client computer 990. As illustrated, for channel Z,2 if the user name were JeffP, "URL A" is returned, and if the user name were NickO, "www.abc.com" is returned.

As another example if the second user at client computer 990 entered the username "DianeE", and channel Z,1, the database would return F,11 to server 930. In response, server 930 looks up F,11 in the table to determine "URL A", for example. Server 930 would then return "URL A" to client computer 990. As illustrated, if the user name were JeffP, for channel Z,2 "URL A" is returned, and if the user name were DianeE, for channel Z,1, "URL A" is returned.

In the foregoing specification, the invention has been described with reference to specific exemplary embodiments thereof. Many changes or modifications are readily envisioned. For example, many different types of streaming protocol than those described above can be used. Further, data other than audio data alone can be transferred from content servers, for example, video data, graphics, text, and the like.

In one embodiment, it is contemplated that a table associated with a user is not actually stored in one particular location. Further it is contemplated that a table is never actually retrieved. Instead, based upon tuner data (a channel/band pair) from the client computer, the server merely determines the appropriate URL. URLs of other channel/band pairs that are not input from the client computer are not determined until needed. Accordingly, steps 530 and 540 and steps 720–770 are simply described as separate steps for sake of understanding. In another embodiment, the server determines appropriate URLs for all channels with a particular band, at one time.

In another embodiment, the URL returned by the server may not necessarily be the URL of the content server. Instead, the URL returned may be to a another server. As discussed above, because server system 120 may comprise one or more physical servers, a first server may not store the content server URL that was requested. Thus, in response, the URL that the first server provides may be the URL of a second server, that may include the content server URL. If the second server 120 does not have the desired content server URL, the second server may provide a URL of a third server, and so on. It is contemplated that after one or more redirections, as described above, the content server URL is located and returned to the user.

The block diagrams of the architecture and flow charts are grouped for ease of understanding. However it should be understood that combinations of blocks, additions of new blocks, re-arrangement of blocks, and the like are contemplated in alternative embodiments of the present invention.

The foregoing description of embodiments of the present invention has been provided for the purposes of illustration and description. It is not intended to be exhaustive or to limit the invention to the precise forms disclosed. Obviously, many modifications and variations will be apparent to the practitioners skilled in this art in light of the present patent disclosure. It is intended that the scope of the invention be defined by the following claims and their equivalents.

What is claimed is:

1. A method for a computer server comprises:

receiving a profile identifier from a first client computer;

receiving a pre-defined identifier from the first client computer, the pre-defined identifier determined in response to a first user selection of a graphical user interface on a display of the first client computer, the graphical user interface including a tuning portion and a first icon, the first user selection of the tuning portion;

determining a uniform resource locator for a streaming media source in response to the pre-defined identifier and in response to the profile identifier;

sending the uniform resource locator to the first client computer;

receiving a save request from the first client computer, the save request determined in response to a second user selection of the graphical user interface on the display of the first client computer, the second user selection of the first icon;

associating a new identifier with the pre-defined identifier, and the profile identifier in response to the save request;

storing the association among the new identifier, the pre-defined identifier, and the profile identifier; thereafter receiving the profile identifier from the first client computer;

receiving the new identifier from the first client computer, the new identifier determined in response to a third user selection of the graphical user interface on the display of the first client computer, the third user selection of the tuning portion;

retrieving the pre-defined identifier in response to the profile identifier and the new identifier;

determining the uniform resource locator for the streaming media source in response to the pre-defined identifier; and sending the uniform resource locator to the first client computer.

2. The method of claim 1 further comprising:

receiving the profile identifier from a second client computer;

receiving the new identifier from the second client computer, the new identifier determined in response to a first user selection of a graphical user interface on a display of the second client computer, the graphical user interface including a tuning portion and a first icon, the first user selection of the tuning portion;

retrieving the pre-defined identifier in response to the profile identifier and the new identifier;

determining the uniform resource locator for the streaming media source in response to the pre-defined identifier and in response to the profile identifier; and sending the uniform resource locator to the second client computer.

3. The method of claim 2 wherein receiving the profile identifier comprises receiving a user name.

4. The method of claim 2 wherein the pre-determined identifier comprises a first band identifier and a first station identifier.

5. The method of claim 4 wherein the new identifier comprises a second band identifier and a second station identifier;

wherein the first band identifier is different from the second band identifier; and wherein the first station identifier is different from the second station identifier.

6. The method of claim 2 wherein receiving the profile identifier from the first client computer comprises receiving the profile identifier from a first user at the first client computer; and wherein receiving the profile identifier from the second client computer comprises receiving the profile identifier from a second user at the first client computer, the first user different from the second user.

7. A computer server having a processor further comprises:

a tangible media coupled to the processor, the tangible media comprising:

an association among a new identifier, a pre-defined identifier, and a profile identifier from a first client computer;

code that directs the processor to receive the profile identifier from a second client computer;

code that directs the processor to receive the new identifier from the second client computer, the new identifier determined in response to a first user selection of a graphical user interface on a display of the second client computer, the graphical user interface including a tuning portion, the first user selection of the tuning portion;

code that directs the processor to retrieve the pre-defined identifier in response to the profile identifier and the new identifier;

code that directs the processor to determine the uniform resource locator for the streaming media source in response to the pre-defined identifier; and code that directs the processor to send the uniform resource locator to the second client computer.

8. The computer system of claim 7 wherein the tangible media further comprises:

code that directs the processor to receive the profile identifier from a third client computer;

code that directs the processor to receive the new identifier from the third client computer, the new identifier determined in response to a first user selection of a graphical user interface on a display of the third client computer, the graphical user interface including a tuning portion and a first icon, the first user selection of the tuning portion;

code that directs the processor to retrieve the pre-defined identifier in response to the profile identifier and the new identifier;

code that directs the processor to determine the uniform resource locator for the streaming media source in response to the pre-defined identifier and in response to the profile identifier; and code that directs the processor to send the uniform resource locator to the third client computer.

9. The computer system of claim 8 wherein code that directs the processor to receive the profile identifier comprises code that directs the processor to receive a user name.

10. The computer system of claim 8 wherein the pre-determined identifier comprises a first band identifier and a first station identifier.

11. The computer system of claim 10 wherein the new identifier comprises a second band identifier and a second station identifier;

wherein the first band identifier is different from the second band identifier; and wherein the first station identifier is different from the second station identifier.

12. The computer system of claim 7 wherein the new identifier, the pre-defined identifier, and the profile identifier are from a first user at a first client computer; and wherein code that directs the processor to receive the profile identifier from the second client computer comprises code that directs the processor to receive the profile identifier from a second user at the second client computer, the first user different from the second user.

13. The computer system of claim 12 wherein the tangible media further comprises:

code that directs the processor to receive another pre-defined identifier from the second client computer, the other pre-identifier determined in response to a second user selection of the graphical user interface on the display of the second client computer, the second user selection of the tuning portion;

code that directs the processor to determine another uniform resource locator for a streaming media source in response to the other pre-defined identifier; and code that directs the processor to send the other uniform resource locator to the second client computer.

14. A method for a computer system comprises:

sending a request to a computer server, the request comprising an identifier associated with a first user and tuning data, the tuning data comprising a band selection and a channel selection, the tuning data determined in response to input from a second user of a tuner portion of a remote tuner coupled to the computer system;

receiving a network address of a streaming media source from the computer server in response to the request, the network address determined in response to the identifier associated with the first user and the tuning data determined in response to the input from the second user;

requesting streaming media data from a content server at the network address;

decoding the streaming media data received from the content server to form a stream of audio data; and outputting the audio data to speakers coupled to the computer system.

15. The method of claim 14 wherein decoding the streaming media data received from the content server also comprises:

decoding the streaming media data received from the content server to form a stream of video data; and outputting the video data to a display coupled to the computer system.

16. The method of claim 14 wherein the first user initiates the association of the tuning data and the network address.

17. The method of claim 14 further comprising sending another request to the computer server, the another request comprising an identifier associated with a third user and the tuning data, the tuning data determined in response to input from the second user of the tuner portion of the remote tuner coupled to the computer system;

receiving another network address of another streaming media source from the computer server in response to the other request, the other network address determined in response to the identifier associated with the third user and the tuning data determined in response to the input from the second user;

requesting streaming media data from another content server at the other network address;

decoding the streaming media data received from the other content server to form another stream of audio data; and outputting the other audio data to speakers coupled to the computer system;

wherein the network address and the other network address are different.

18. The method of claim 17 wherein the third user initiates the association of the other tuning data and the other network address.

19. The method of claim 14 wherein the first user initiates the association of the tuning data and the network address.

20. The method of claim 14 further comprising:

sending another request to the computer server, the another request comprising an identifier associated with a third user and additional tuning data, the additional tuning data determined in response to input from the second user of the tuner portion of the remote tuner coupled to the computer system;

receiving the network address of the streaming media source from the computer server in response to the other request, the network address determined in response to the identifier associated with the third user and the additional tuning data determined in response to the input from the second user;

requesting the streaming media data from the content server at the network address;

decoding the streaming media data received from the content server to form the stream of audio data; and outputting the audio data to speakers coupled to the computer system.

* * * * *